A. J. FRENCH.
VAGINAL-SYRINGE.
No. 178,283. Patented June 6, 1876.
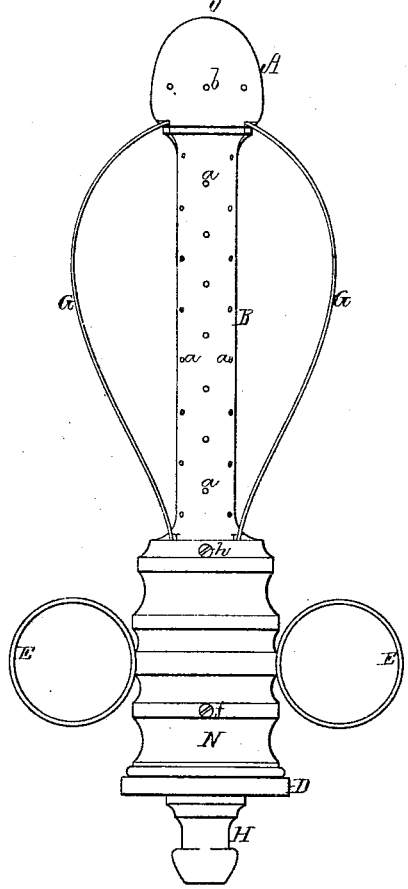
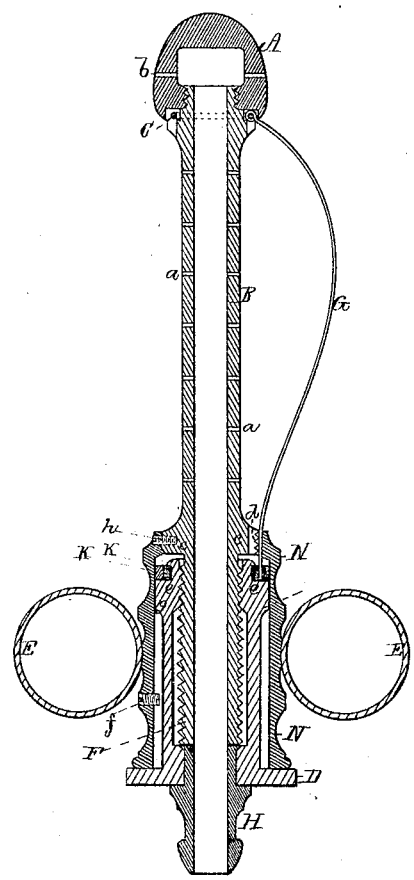
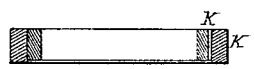
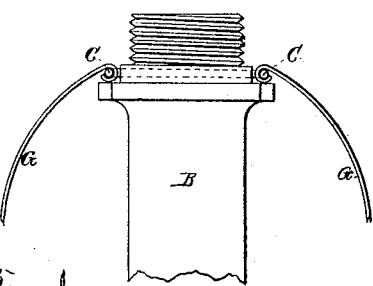
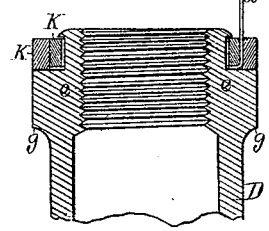
Witnesses
S. N. Piper
L. N. Möller
Andrew Jackson French
by his attorney
R. H. Eddy

UNITED STATES PATENT OFFICE.

ANDREW J. FRENCH, OF PORTSMOUTH, NEW HAMPSHIRE.

IMPROVEMENT IN VAGINAL SYRINGES.

Specification forming part of Letters Patent No. 178,283, dated June 6, 1876; application filed April 24, 1876.

*To all whom it may concern:*

Be it known that I, ANDREW J. FRENCH, of Portsmouth, of the county of Rockingham, of the State of New Hampshire, have invented a new and useful Vaginal or Rectal Irrigator; and do hereby declare the same to be fully described in the following specification, and represented in the accompanying drawings, of which—

Figure 1 denotes a side view, and Fig. 2 a longitudinal section, of it. Fig. 3 is a representation of the upper part of the spray-duct, showing the connection of the springs therewith. Fig. 4 is a section of the upper portion of the rotary nut for effecting the expansion and contraction of the springs. Fig. 5 is a section of the collars for fixing the springs to the nut.

The apparatus or instrument hereinafter described is to effect the irrigation or washing of the vagina or the rectum—as it may be employed for either.

My invention therein relates, first, to the combination of a separate tubular case with the conoidal-headed spray-tube, its screw, series of springs, and operative screw-nut for effecting expansion of the vagina; second, to the combination of a swiveling nipple with the perforated or spray-tube, its screw-nut, and said series of springs; third, to the combination of two rings, the tubular case, the perforated or spray-tube, and the series of springs and operative nut for effecting expansion of of the vagina.

In the drawings, B represents the duct, which is a long tube, having numerous perforations, a a, made laterally in it. At its posterior end the tube has a swiveling nipple, H, applied to it, such being to connect the duct to the elastic tube of an injection or lavement apparatus or syringe. The duct at its anterior end screws into a fellow conoidal head, A, having perforations b extending laterally through it. Furthermore, the duct is provided with an extension, c, and two male screws, F and d, arranged as represented, one of them being on the periphery of the said extension, and having screwed upon it a tubular casing, N. A tubular nut, D, provided with a riveted head, e, screws upon the screw F, and is arranged therewith and in the case N in manner as shown, the said case or handle being furnished with two rings, E E, extended from it as represented. A series of three or any other suitable number of springs, G, pivoted at their upper ends upon a ring, C, arranged on the duct B, as shown, extends down alongside of the duct and loosely through the extension c, each of the said springs going between two collars or rings, K K, arranged on the nut D, in manner as shown. Each spring hooks under the inner of the said rings. The inner collar should be fixed to the nut, so as to enable the nut to revolve without revolving the collar, which, however, is to move with the nut in its lengthwise movement on the screw F. The extent of the outward movement of the nut is determined by a stop-screw, f, arranged in the casing N, and by a shoulder, g, on the nut, such screw and shoulder being to prevent the nut from being turned back far enough to overstrain or break the springs G. A small screw, h, going through the case N and screwed into the extension c, serves to prevent the case from accidentally revolving on the said extension.

In using the vaginal irrigator, it, with its springs contracted or drawn straight, is to be introduced into the vagina, and there held by one hand applied to the handle and the two rings, E, after which the nut should be revolved, so as to bow the springs G in a manner to raise them to expand the organ. The conoidal head A, by covering the mouth of the uterus, will prevent the washing-liquid from penetrating therein. By working the injection apparatus, whose induction-tube is to be supposed to be in a basin or vessel containing the lavement or washing fluid, such fluid will be driven into the duct B and its head A, and be discharged therefrom laterally in numerous jets against the expanded walls of the vagina.

The instrument combines the advantages of an irrigator and douche, it being applicable to the rectum as well as to the vagina. Its safety-cap or conoidal head, by having its eduction-holes in its side only, will, by being pressed against the mouth of the uterus, operate to seal it.

The expansive springs are to be covered with india-rubber, or other suitable soft and water-proof material, in order that they may not injure the vaginal canal. The instrument can be used with its springs either bowed or straight, and will be found of great advantage for the purpose for which it is intended.

I do not claim, in combination with a spray-tube, a slotted tube to slide thereon, and having its parts between its slots to act like bow-springs in order to effect expansion of the part into which such tube may be inserted, all being as shown in the United States Patent No. 88,695.

I claim as my invention as follows, viz:

1. The combination of the case N, with the spray-tube B, its screw F, series of springs G; and tubular screw-nut D, all being arranged and applied essentially as shown and described.

2. The combination of the swiveling nipple H with the perforated tube B, screw F, nut D, and series of springs G, all arranged and applied substantially as specified.

3. The combination of the rings E E, case N, nut D, screw F, perforated tube B, and the series of springs G, all being arranged and applied substantially as set forth.

A. J. FRENCH.

Witnesses:
R. H. EDDY,
J. R. SNOW.